United States Patent [19]

Shimizume et al.

[11] Patent Number: 5,548,569
[45] Date of Patent: Aug. 20, 1996

[54] TRACKING TRAVERSE CONTROL CIRCUIT FOR HEAD UNIT OF DISC PLAYER

[75] Inventors: Kazutoshi Shimizume; Mamoru Akita; Yoshinori Tsuboi, all of Kanagawa, Japan

[73] Assignee: Sony Corporation, Japan

[21] Appl. No.: 324,982

[22] Filed: Oct. 18, 1994

[30] Foreign Application Priority Data

Oct. 22, 1993 [JP] Japan .................................. 5-264638

[51] Int. Cl.$^6$ ........................................................ G11B 7/00
[52] U.S. Cl. ........................... 369/44.28; 369/44.25; 360/78.05; 360/78.06
[58] Field of Search ........................... 369/44.28, 44.29, 369/44.34, 32, 44.25; 360/78.05, 78.06, 78.09, 78.11, 78.14

[56] References Cited

U.S. PATENT DOCUMENTS

| | | | |
|---|---|---|---|
| 4,901,299 | 2/1990 | Nakatsu | 369/32 |
| 4,914,725 | 4/1990 | Belser et al. | 360/77.08 X |
| 5,063,549 | 11/1991 | Yamamuro | 369/44.28 |
| 5,335,214 | 8/1994 | Matoba et al. | 369/44.29 X |

FOREIGN PATENT DOCUMENTS

| | | |
|---|---|---|
| 0090379 | 10/1983 | European Pat. Off. . |
| 0164071 | 12/1985 | European Pat. Off. . |
| 0408392 | 1/1991 | European Pat. Off. . |

*Primary Examiner*—Aristotelis Psitos
*Assistant Examiner*—Thang V. Tran
*Attorney, Agent, or Firm*—Ronald P. Kananen

[57] ABSTRACT

Provision is made of a traverse cycle measuring circuit for measuring the traverse cycle based on a signal CNIN obtained by digitalizing the tracking error signal at the time of a track traverse, a register in which any target value of the traverse cycle can be set, a circuit for comparing the measured traverse cycle and set target value, control circuits, for controlling the tracking and sled so that the detected speed of traverse converges to a target value, and counting circuits for counting the number of traversed tracks based on the signal CNIN, the target value of the register being reset to a value by which the speed of traverse is reduced when the count of the counting circuit reaches a number of tracks (N-α) smaller than the target number of tracks by exactly α.

12 Claims, 10 Drawing Sheets

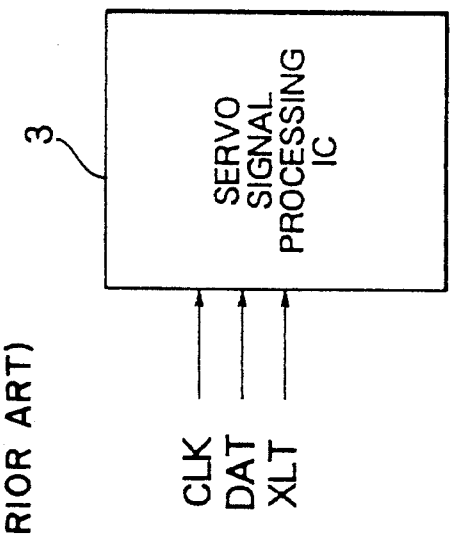
FIG. 2
(PRIOR ART)
CLK
DAT
XLT
FIG. 3A
(PRIOR ART)
FIG. 3B
(PRIOR ART)
FIG. 3C
(PRIOR ART)

FIG. 4A
(PRIOR ART)

| D7 | D6 | D5 | D4 | D3 | D2 | D1 | D0 |
|----|----|----|----|----|----|----|----|
| 0  | 0  | 1  | 0  | T2 | T1 | S2 | S1 |

FIG. 4B
(PRIOR ART)

| T2 | T1 | TRACKING COMMAND |
|----|----|------------------|
| 0  | 0  | TRACKING SERVO OFF |
| 0  | 1  | TRACKING SERVO ON |
| 1  | 0  | TRACKING FORWARD KICK |
| 1  | 1  | TRACKING REVERSE KICK |

FIG. 4C
(PRIOR ART)

| S2 | S1 | SLED COMMAND |
|----|----|--------------|
| 0  | 0  | SLED SERVO OFF |
| 0  | 1  | SLED SERVO ON |
| 1  | 0  | SLED FORWARD KICK |
| 1  | 1  | SLED REVERSE KICK |

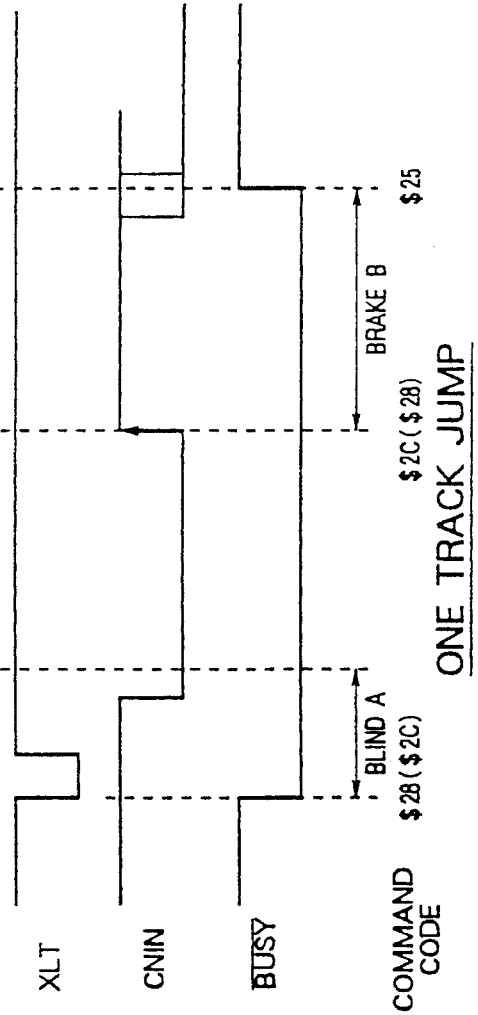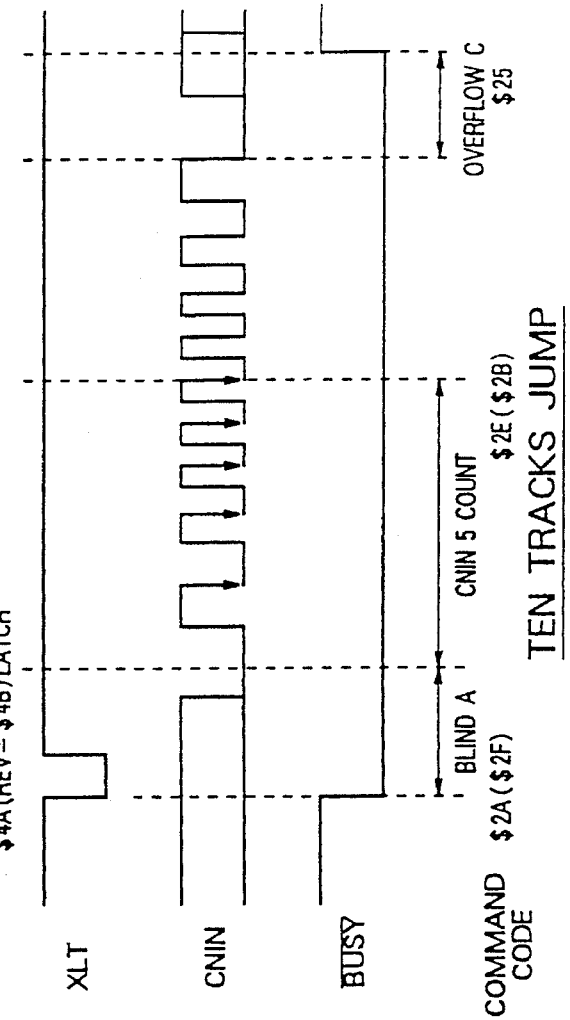

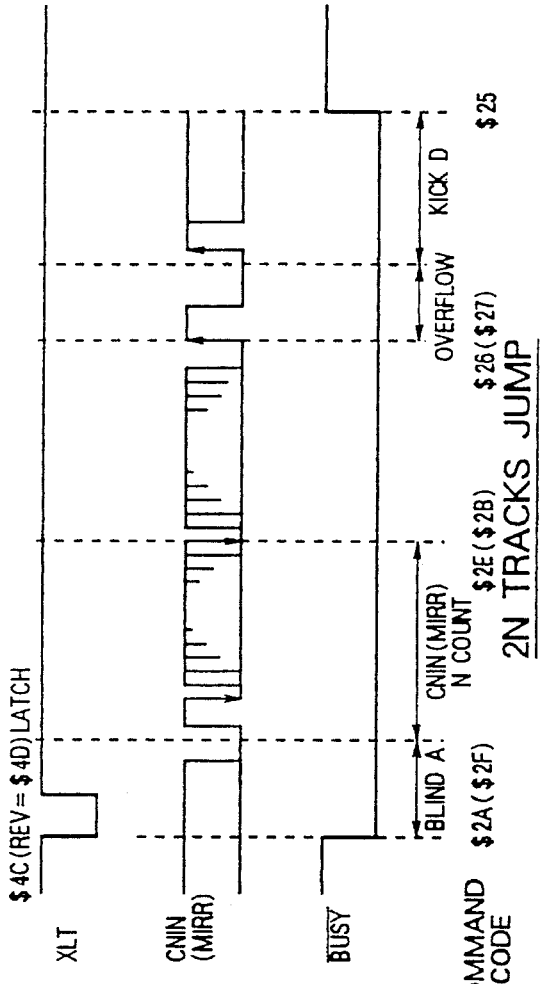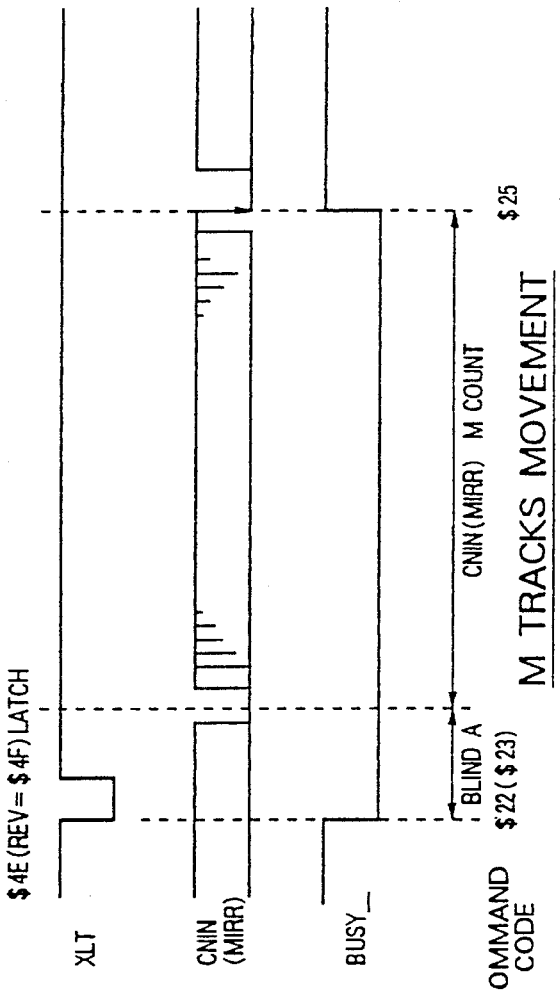

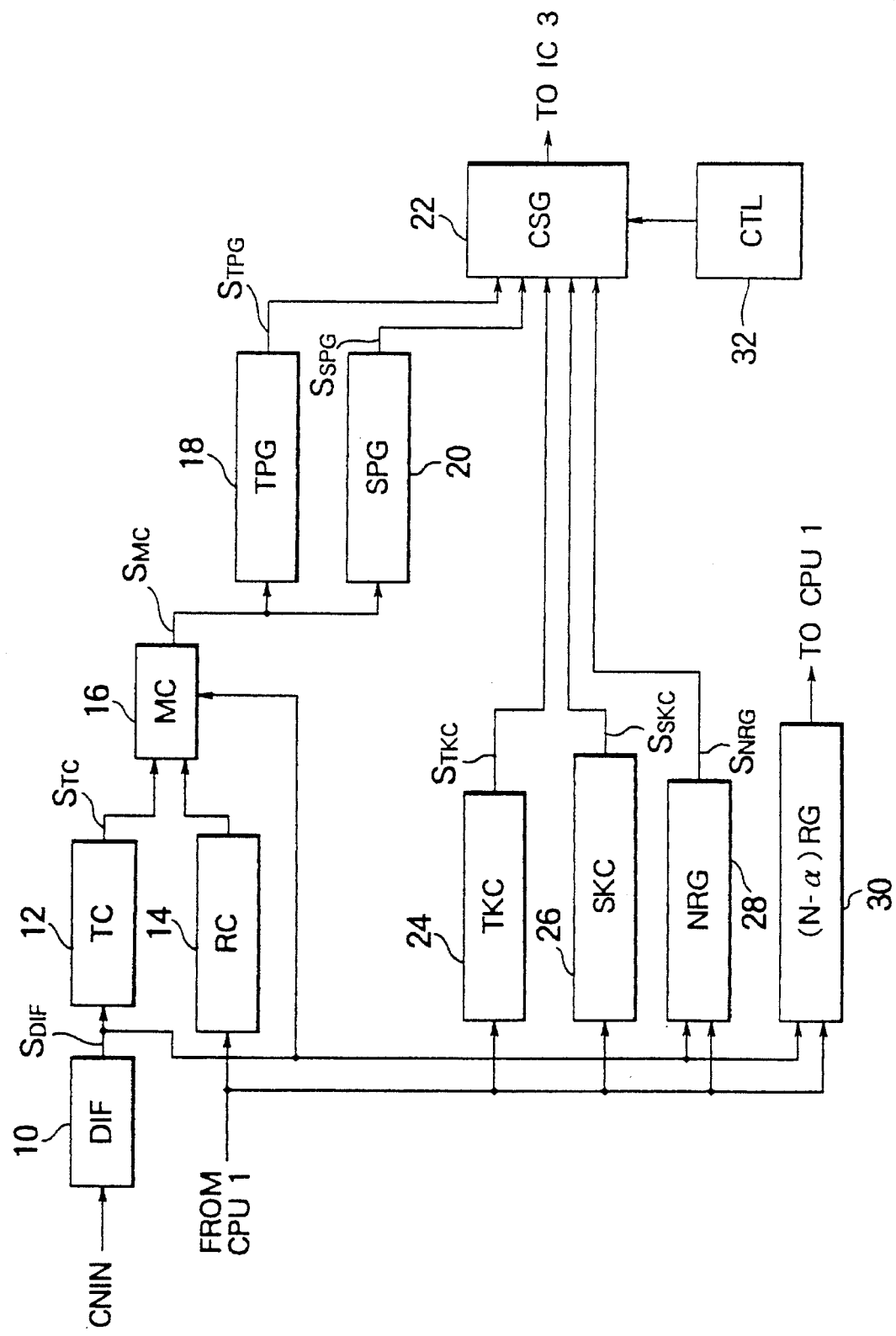

V : SPEED OF TRAVERSE MOVEMENT
$v_t$ : SPEED OF TRACKING MOVEMENT
$v_s$ : SPEED OF SLED MOVEMENT $$V = v_t + v_s$$

OPTIMUM SLED SPEED

INSUFFICIENT SPEED OF SLED MOVEMENT

EXCESS SPEED OF SLED MOVEMENT

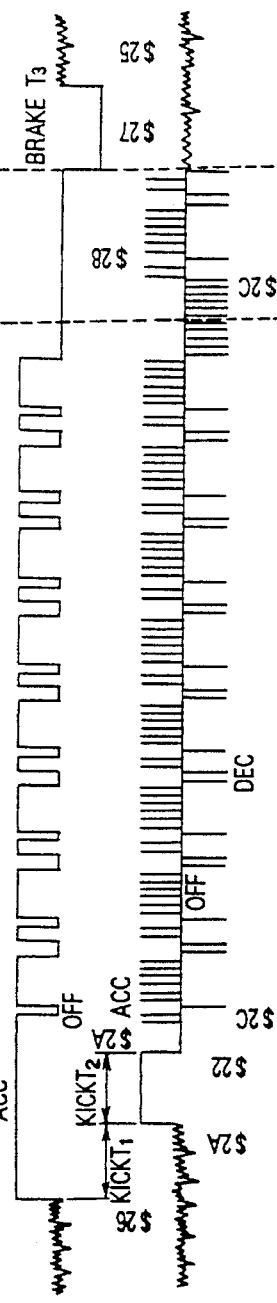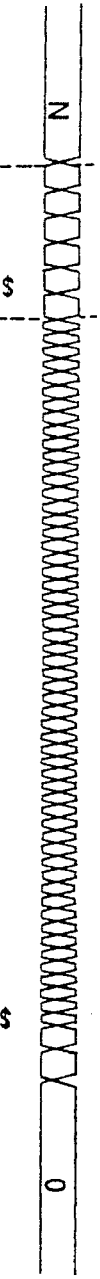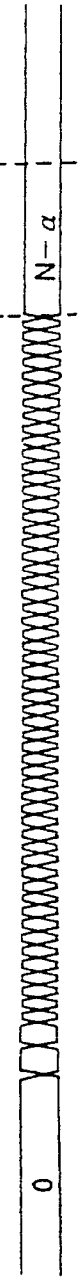
FIG. 13A TE
FIG. 13B CNIN
FIG. 13C SLD DRIVE
FIG. 13D Tr DRIVE
FIG. 13E A.S.N TRACK COUNTER
FIG. 13F N TRACK MONITOR COUNTER
FIG. 13G SENS (comp)
FIG. 13H RC

TRACKING TRAVERSE CONTROL CIRCUIT FOR HEAD UNIT OF DISC PLAYER

BACKGROUND OF THE INVENTION

1. Field of the Invention

The present invention relates to a tracking traverse control circuit for controlling the track jump operation in a CD player etc.

2. Description of the Related Art

In a CD player, there are often cases of jumping from one track to another track, for example, at the time of going to the start of a music.

In particular, in a CD ROM, it is particularly important in terms of performance that data can be instantaneously retrieved. Therefore, the performance of the optical servo signal processing circuit for processing optical servo signals has important significance.

Optical system servo signal processing circuits for CD players have already been realized by LSIs. At the present time, both analog processing and digital processing types are in general use.

In current general servo systems, circuits for controlling the servo signal processing (servo auto sequencers) are being developed. These sequencers are being controlled by microcomputers.

FIG. 1 is a block diagram of a servo signal control system of a CD player.

In FIG. 1, 1 represents a CPU used as a microcomputer, 2 represents a servo auto sequencer, 3 represents a servo signal processing IC, and 4 represents an optical system.

In such a configuration, when a servo auto sequencer 2 receives an auto sequence command $S_1$ from the CPU 1, a servo control sequence is started, and a command code and 8-bit serial data are generated for controlling the servo signal processing IC 3 to supply them to the servo signal processing IC 3 as a signal $S_2$.

The signal $S_2$ supplied from the servo auto sequencer 2 to the servo signal processing IC 3, more specifically, as shown in FIG. 2, is comprised of the clock signal CLK, data DAT, and latch signal XLT.

The data DAT, as shown in FIG. 4A, is comprised of D0 to D7 8-bit serial code data. The upper four bits "0010" of the 8-bit serial code mean that the command relates to tracking servo and sled servo control. Among the lower four bits at this time, as shown in FIGS. 4B and 4C, the T2 and T1 corresponding to the data D3 and D2 show tracking commands and the S2 and S1 corresponding to the data D1 and D0 show sled commands.

In these tracking commands T1 and T2 and sled commands S2 and S1, "00" is a "servo off" command by which no control signals are generated for the optical system 4.

"01" means "servo on" and forms a normal servo loop.

"10" means "forward direction", that is, is a command for moving from the inner circumferential direction to the outer circumferential direction of the disk.

"11" means "reverse direction" that is, is a command for moving from the outer circumferential direction to the inner circumferential direction of the disk.

The actual operation is performed by the transmission of the above serial commands from the servo auto sequencer 2 to the servo signal processing IC 3.

FIG. 5 is a conceptual view showing the basic configuration of the optical system 4. In FIG. 5 represents an optical disk, and 6 represents a spindle motor.

The optical system 4, as shown in FIG. 5, is comprised by a semiconductor laser 41, a beam splitter 42, an objective lens 43, a cylindrical lens 44, a photodetector 45, a tracking servo mechanism TRK, a focus servo mechanism FOC, and a sled servo mechanism SLD.

In this optical system 4, the laser beam emitted from the semiconductor laser 41 passes through the beam splitter 42 and strikes on the lens 43. The laser light striking on the lens 43 is converged thereat and emitted as a spot of light on a desired track of the optical disk 5.

The spot of laser light emitted on the optical disk 5 is reflected on the optical disk 5 and is returned to the lens 43. This reflected returned light passes through the lens 43 and strikes on the beam splitter 42. The light striking the beam splitter 42 is reflected and strikes on the cylindrical lens 44 where it is converged and received by the photodetector 45.

In the photodetector 45 such as a four division photo detector, the reflected-returned light is converted to an electrical signal of a level in accordance with the amount of received light. This electrical signal is subjected to a predetermined signal processing. As a result, a tracking error signal TE etc. is generated and is fed back to the servo signal processing IC 3. Servo control is performed based on the tracking error signal TE etc.

The servo control covers the tracking servo mechanism TRK, the focus servo mechanism FOC, and the sled servo mechanism SLD. At the time of tracking, however, it mainly covers the tracking servo mechanism TRK and the sled servo mechanism SLD.

The tracking servo mechanism is controlled so that the beam of light from the semiconductor laser 41 of the optical system correctly follows the track, that is, tracking is performed.

The sled servo control mechanism is a servo system for places the optical system 4 on a slider and moves the optical system by the slider to a range which the tracking servo mechanism can cover, since the tracking servo mechanism alone cannot trace the entire surface of the disk in a CD player. Normally, in a sled servo mechanism, the servo control is performed so that the low frequency band component of the tracking servo mechanism becomes 0. The reason is that the tracking servo mechanism lens is always made to operate directly above nearby.

The tracking traverse control of the servo auto sequencer 2 for moving the optical system from the current track to a target track using this servo system is provided with a high precision traverse single-track jump and 10-track jump and poor precision, but short convergence 2N-track jump and M-track move sequences.

FIGS. 6A to 6C, FIGS. 7A to 7C, FIGS. 8A to 8C and FIGS. 9A to 9C are timing charts of the time of a conventional single-track jump, 10-track jump, 2N-track jump, and M-track move.

The signal CNIN shown in these figures is a digitalized form of the tracking error signal TE and is generated in the servo signal processing IC. The inverted busy signal BUSY_ shows the execution of an auto sequence at the time of a low level. Further, BLIND A is a predetermined time set as the standby time from when the latch signal XLT becomes active at a low level ("low active").

When performing a single-track jump forward, as shown in FIGS. 6A to 6C, a code $48 (reverse is $49) command is received from the CPU 1. Along with this, the latch signal XLT becomes "low active" and the inverted busy signal BUSY_ becomes the low level. Further, the code $28 command is sent to the servo signal processing IC 3. As a result, a tracking forward kick is performed. Next, when the next rising edge of the signal CNIN is detected, the code $2C command is issued and a brake is energized. After the elapse of the period BRAKE B, a code $25 command is issued and the tracking servo mechanism and sled servo mechanism turn on.

When performing a 10-track jump forward, as shown in FIGS. 7A to 7C, a code $4A (reverse is $4B) command is received from the CPU 1. Along with this, the latch signal XLT becomes "low active" and the inverted busy signal BUSY_ becomes the low level. Further, the code $2A command is sent to the servo signal processing IC 3. As a result, a tracking forward kick is performed.

Next, after the elapse of the period BLIND A, five of the next trailing edges of the signal CNIN are counted. When five are counted, a code $2E command is issued. As a result, a tracking reverse kick is performed and a brake is applied to the tracking actuator. The fact that the speed of the actuator has become sufficiently slow is detected, a code $25 command is issued, and the tracking servo mechanism and sled servo mechanism are turned on.

The detection of the speed of the actuator becoming sufficiently slow is performed by detecting when one cycle of the signal CNIN becomes longer than a preset overflow C.

When performing a 2N-track jump forward, as shown in FIGS. 8a to 8c, a code $4C (reverse is $4D) command is received from the CPU 1. Along with this, the latch signal XLT becomes "low active" and the inverted busy signal BUSY_ becomes the low level. Further, the code $2A command is sent to the servo signal processing IC 3.

This 2N-track jump is basically the same in sequence as the 10-track jump, but differs in the fact that after the tracking servo mechanism is turned on, the sled is continued to be moved for exactly the time KICK D.

When performing an M-track move, as shown in FIGS. 9A to 9C, a code $4E (reverse is $4F) command is received from the CPU 1. Along with this, the latch signal XLT becomes "low active" and the inverted busy signal BUSY_ becomes the low level. Further, the code $22 command is sent to the servo signal processing IC 3. Due to this, just a sled forward kick is performed. Next, after the elapse of the period BLIND A, M number of the signal CNIN are counted. When M number are counted, a code $25 command is issued and the tracking servo mechanism and sled servo mechanism are turned on. In this way, the M track move adopts the system of moving just the sled and is suitable for large moves of several hundreds to several tens of thousands of tracks.

However, in the above-mentioned tracking traverse control, while various modes are provided and anything from single-track jumps to major track movements of several hundred to several thousands of tracks are possible, small movements of relatively small numbers of track traverses are high in accuracy, but inaccurate as to the number of tracks traversed, so in the end a repeat traverse becomes necessary for correction and as a result a long time ends up being taken until the target track is reached. Contrary, large movements of more than several hundred track traverses are problematic as to precision though the jumps of several hundred tracks etc. can be ended in a short time. That is, in the past, a high speed seek operation was difficult since there was no sequencer precision in a short time.

Further, in the above-mentioned tracking traverse control, the sled was not controlled in accordance with the state of the traverse, so when the traverse involved more than several hundred tracks, with the sled stopped in state, the range of controllable tracking ended up being exceeded.

Further, at the time when starting a traverse, the sled is unstable in the start of operation due to static friction. Further, it suffers from the disadvantage that a long time ends up being taken until the set speed of traverse is reached in the tracking.

SUMMARY OF THE INVENTION

An object of the present invention is to provide a tracking traverse circuit which enables tracking to be performed in a short time and with a high precision, enables realization of a high speed seek operation, promotes stability of the time of start of operation of the sled, and enables the set speed of traverse to be reached in a short time.

To achieve the above object, the tracking traverse control circuit of the present invention including a movement speed detection means for detecting the speed of movement of the head unit based on a signal obtained from the head unit at the time of a track traverse and a movement speed control means for comparing the detected speed of movement and a preset target value of a speed of movement and controlling the speed of movement of the head unit so that the detected speed of movement converges with the target value.

Also, the tracking traverse control circuit of the present invention is provided with a movement speed detection means for detecting the speed of movement of the head unit based on a signal obtained from the head unit at the time of a track traverse, a target value setting means for setting the target value of the speed of movement of the head unit to any value, a movement speed control means for comparing the detected speed of movement and a preset target value of a speed of movement and controlling the speed of movement of the head unit so that the detected speed of movement converges with the target value, a counting means for counting the number of traversed tracks based on a signal obtained from the head unit, and a target value changing means for resetting the target value of the target value setting means to a value of a speed of movement controlled for deceleration when the count of the counting means reaches a number of tracks less than the target number of traversed tracks by exactly a preset number of tracks.

Further, in the tracking traverse control circuit of the present invention, the head unit has a tracking servo system and a sled servo system for making the entire head unit move and the movement speed control means sets the sled servo system to an acceleration state when the tracking servo system is set to the acceleration state and sets the sled servo system to a deceleration state when the tracking servo system is set to a deceleration state in accordance with the results of comparison of the detected speed of movement and the set target value.

Moreover, in the tracking traverse control circuit of the present invention, the head unit has a tracking servo system and a sled servo system for making the entire head unit move and the movement speed control means sets the sled servo system to an acceleration state when the tracking servo system is set to the acceleration state and sets the sled servo system to a stopped state when the tracking servo system is set to a deceleration state in accordance with the results of comparison of the detected speed of movement and the set target value.

In the tracking traverse control circuit of the present invention, the head unit has a tracking servo system and a sled servo system for making the entire head unit move and the movement speed control means sets the sled servo system to an acceleration state when the tracking servo system is set to the acceleration state and sets the sled servo system to a deceleration state when the tracking servo system is set to a deceleration state in accordance with the results of comparison of the detected speed of movement and the set target value before the count of the counting means reaches a number of tracks less than the target number of traversed tracks by exactly a preset number of tracks and sets at least the sled servo system to the deceleration state after the count of the counting means reaches a number of tracks less than the target number of traversed tracks by exactly a preset number of tracks.

Also, the tracking traverse control circuit of the present invention is provided with a means for causing the sled servo system to accelerate for a predetermined time when starting the traverse.

Further, the tracking traverse control circuit of the present invention is provided with a means for causing the tracking servo system to accelerate for a predetermined time when starting the traverse.

Moreover, the tracking traverse control circuit of the present invention is provided with a means for applying braking to the sled servo system when the count of the counting means reaches the target number of traversed tracks.

In the present invention, when a track traverse from a current track to a target track is started, the speed of movement of the head unit is detected based on a signal obtained from the head unit in the movement speed detection means. The detected speed of movement is input to the movement speed control means where it is compared with a preset target value of the speed of movement. Based on the results of the comparison, the speed of movement of the head unit is controlled so that the detected speed of movement converges to the target value.

Also, in the present invention, before the track traverse is started, a target value of the speed of movement of the head unit is set in the target value setting means and, for example, the number of tracks to be traversed is set in the counting means. In this state, when a track traverse from a current track to a target track is started, the speed of movement of the head unit is detected based on a signal obtained from the head unit in the movement speed detection means and the number of traversed tracks is counted by the counting means. The detected speed of movement is input to the movement speed control means where it is compared with a preset target value of the speed of movement. Based on the results of the comparison, the speed of movement of the head unit is controlled so that the detected speed of movement converges to the target value. Here, when the count of the counting means reaches a number of tracks less than the target number of traversed tracks by exactly a preset number of tracks, the target value of the target value setting means is reset by the target value changing means to a value by which the speed of movement is reduced. By this, the movement speed control means performs control so that the speed of movement of the head converges to the reset target value.

Further, in the present invention, in the movement speed control means, the sled servo system as well is set to an acceleration state when the tracking servo system is set to the acceleration state in accordance with the results of comparison of the detected speed of movement and the set target value and the sled servo system is set to the deceleration state or the stopped state when the tracking servo system is set to the deceleration state.

Moreover, in the present invention, in the movement speed control means, the sled servo system is also set to an acceleration state when the tracking servo system is set to the acceleration state and the sled servo system is set to a deceleration state when the tracking servo system is set to a deceleration state in accordance with the results of comparison of the detected speed of movement and the set target value before the count of the counting means reaches a number of tracks less than the target number of traversed tracks by exactly a preset number of tracks. Further, at least the sled servo system is set to the deceleration state after the count of the counting means reaches a number of tracks less than the target number of traversed tracks by exactly a preset number of tracks.

In the present invention, the sled servo system is accelerated for a predetermined time when starting the traverse, whereby the static friction of the sled is eased.

Also, in the present invention, the tracking servo system is accelerated for a predetermined time when starting the traverse, whereby the target speed of traverse is quickly reached.

Further, in the present invention, a brake is applied to the sled servo system when the count of the counting means reaches the target number of traversed tracks.

BRIEF DESCRIPTION OF THE DRAWINGS

These and other objects and features of the present invention will be more apparent from the ensuing description of the preferred embodiments, in which:

FIGS. 2 and 3A to 3C are views for explaining the signal output from the servo auto sequencer of FIG. 1 to the servo signal processing IC;

FIGS. 4A to 4C are views for explaining details of the data output from the servo auto sequencer of FIG. 1 to the servo signal processing IC;

FIGS. 6A to 6C are timing charts of a one track jump in the conventional tracking traverse control;

FIGS. 7A to 7C are timing charts of a 10 track jump in the conventional tracking traverse control;

FIGS. 8A to 8C are timing charts of a 2N track jump in the conventional tracking traverse control;

FIGS. 9A to 9C are timing charts of an M track move in the conventional tracking traverse control;

FIG. 10 is a block diagram showing an embodiment of a tracking traverse control circuit according to the present invention;

FIGS. 12A to 12C are views for explaining the relationship between tracking servo control and sled servo control, wherein FIG. 12A is a view showing the state where the speed of tracking movement is zero and the speed V of traverse movement and the speed $V_S$ of sled movement coincide, FIG. 12B is a view showing when the speed of tracking movement is positive (>0) and the speed of sled movement is slower than the speed of traverse movement, and FIG. 12C is a view showing when the speed of traverse movement is negative (<0) and the speed of sled movement is slower than the speed of traverse movement; and FIGS. 13A to 13H are timing charts of the case of jumping N tracks by the circuit of FIG. 10.

DESCRIPTION OF THE PREFERRED EMBODIMENTS

Figure 1:
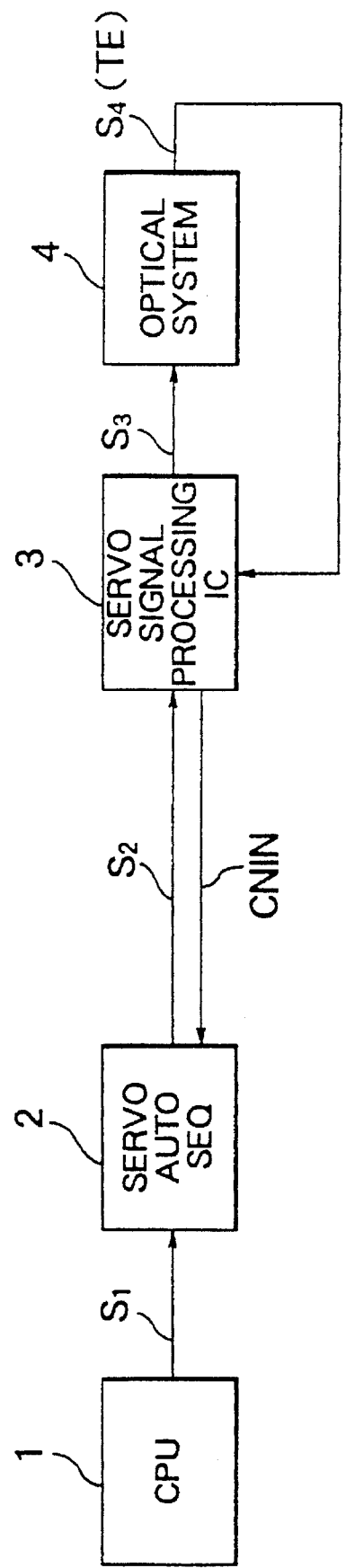
FIG. 1 is a block diagram of the servo signal control system of a CD player.
Figure 5:
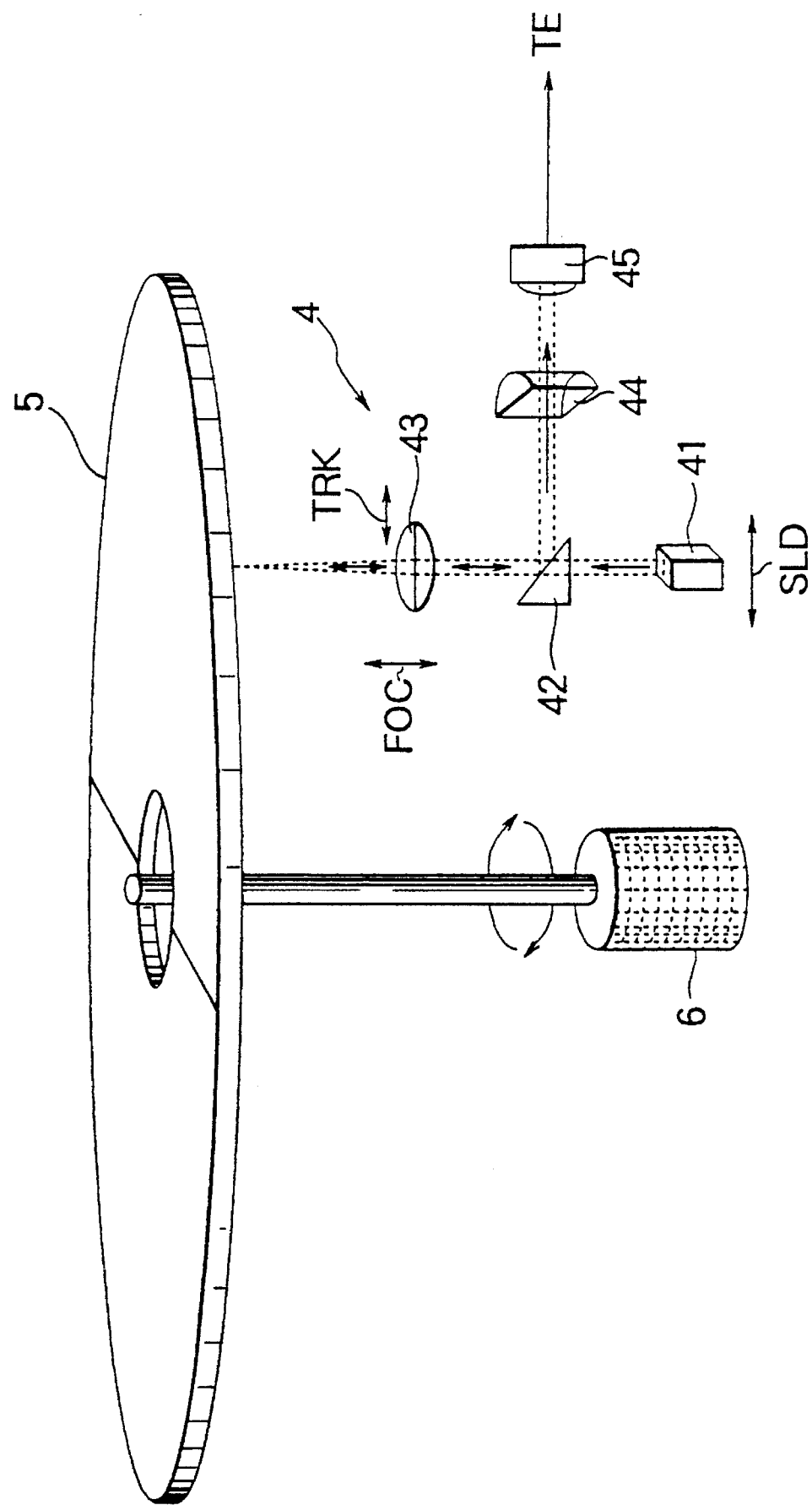
FIG. 5 is a conceptual view showing the basic configuration of the optical system.

FIG. 10 is a block diagram showing an embodiment of a tracking traverse control circuit according to the present invention. This tracking traverse control circuit is applied to the servo sequencer 2 of FIG. 1.

In FIG. 10, DIF 10 represents a rising edge differential circuit, 12 represents a traverse cycle measuring circuit, 14 represents a target traverse cycle setting register, 16 represents a data comparison circuit, 18 represents a tracking control pulse command generation circuit, 20 represents a sled control pulse command generation circuit, 24 represents a tracking kick pulse command generation circuit, 26 represents a sled kick/brake pulse command generation circuit, 28 represents a transverse track number N setting/counting circuit, 30 represents a traverse track number (N-α) setting/counting circuit, 22 represents a command selective generation circuit, and 32 represents a command selective control circuit.

The rising edge differentiation circuit 10 receives as input the signal CNIN of the tracking error signal TE digitalized at a not shown servo signal processing IC, digitally differentiates the rising edge of the input signal CNIN to generate the signal $S_{DIF}$, and outputs the result to the traverse cycle measuring circuit 12, transverse track number N setting/counting circuit 28, and traverse track number (N-α) setting/counting circuit 30. The number of pulses of the differentiated pulse signal $S_{DIF}$ show the number of the traversed tracks, while the interval between pulses shows the cycle of the traverse.

The traverse cycle measuring circuit 12 measures the interval of the traverses (cycle) using the input of the differentiated pulse signal $S_{DIF}$ as a trigger. More specifically, it is comprised of a counter to which the differentiated pulse signal $S_{DIF}$ is input, measures the interval until the next differentiated pulse signal $S_{DIF}$ is input, and outputs the measured value as the signal $S_{TC}$ to the data comparison circuit 16. Note that the traverse cycle measuring circuit 16 is reset with each input of the differentiated pulse signal $S_{DIF}$.

The target traverse cycle setting register 14 stores the target value data of the traverse cycle set to any time at the not shown CPU. The target value data is preset by the CPU.

The data comparison circuit 16 compares the actual traverse cycle shown by the output signal $S_{TC}$ of the traverse cycle measuring circuit 12 and the target value set in advance in the target traverse cycle setting register 14, produces a signal $S_{MC}$ showing is the actual traverse cycle is shorter or longer than the target value with each differentiated pulse signal $S_{DIF}$, and outputs the same to the tracking control pulse command generation circuit 18 and sled control pulse command generation circuit 20.

Figures 11A, 11B:
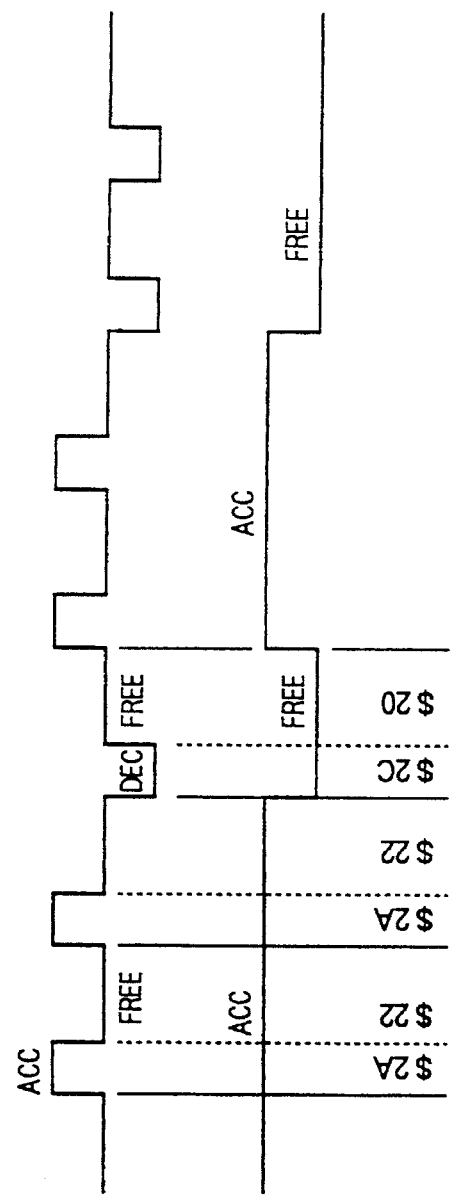
FIGS. 11A and 11B are views showing waveforms of the tracking control pulses and the sled control pulses.

The tracking control pulse command generation circuit 18 receives the output signal of the data comparison circuit 16, generates a command for issuing the tracking control pulse $S_{TCP}$ shown in FIGS. 11A and 11B in accordance with the length of the actual traverse cycle with respect to the target value, and outputs the same as the signal $S_{TPG}$ to the command selective generation circuit 22. More specifically, when the actual traverse cycle is longer than the target value, the traverse cycle becomes slower than the target value, so a command for issuing a kick pulse for speeding up (accelerating) the traverse is generated. As opposed to this, when the actual traverse cycle is shorter than the target value, the traverse cycle becomes faster than the target value, so a command for issuing a kick pulse for slowing down (decelerating) the traverse is generated.

The sled control pulse command generation circuit 20 receives the output signal $S_{MC}$ of the data comparison circuit 16, issues a command for generating a sled control pulse $S_{SCP}$ as shown in FIGS. 11A and 11B in accordance with the length of the actual traverse cycle with respect to the target value, and outputs this as the signal $S_{SPG}$ to the command selective generation circuit 22. More specifically, when the actual traverse cycle is longer than the target value and the traverse cycle is slower than the target value, a command for issuing a kick pulse for speeding up the sled is generated. As opposed to this, when the actual traverse cycle is shorter than the target value and the traverse cycle is faster than the target value, a command for stopping the sled to stop and wait at that position until the traverse in the deceleration state catches up.

As shown in FIGS. 11A and 11B, when the tracking control and sled control are accelerated, code $2A and $22 commands are successively sent out from the command selective generation circuit CSG to the not shown servo signal processing IC. When the tracking control is decelerating and the sled control is stopped, the code $2C and $20 commands are successively sent out.

Below, a more detailed explanation will be made with reference to FIGS. 12A to 12C of the relationship between the tracking servo control and sled servo control. V represents the speed of traverse movement, $V_t$ represents the speed of tracking movement, and $V_S$ represents the speed of sled movement. The sum of the speed of tracking movement $V_t$ and the speed of sled movement $V_S$ is the speed of traverse movement V. This example shows the case of jumping tracks from the left to the right in the figure.

Figure 12A:
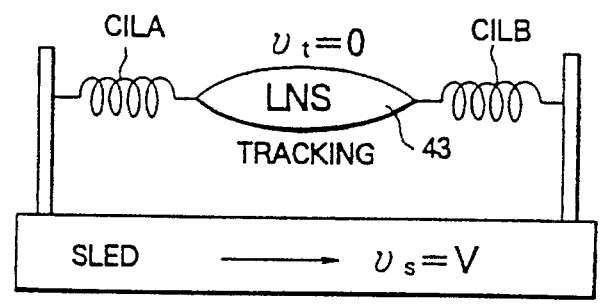

FIG. 12A is a view of the state where the speed of tracking movement $V_t$ is zero and the speed of traverse movement V and the speed of sled movement $V_S$ match. In this state, the sled SLD does not have to be accelerated or decelerated, that is, the sled SLD is in the optimal speed state. If the speed of movement $V_S$ of the sled SLD can always be controlled in this way, it would be possible for the traverses to be made stably to all positions on the disk. That is, this is the ideal state.

Figure 12B:
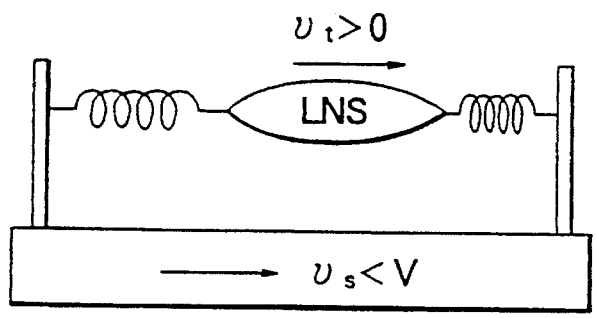

On the other hand, FIG. 12B is a view of the time when the speed of tracking movement $V_t$ represents positive (>0) and the speed of sled movement $V_S$ represents slower than the speed of traverse movement V. In this case, to compensate for the insufficient speed of the sled SLD, the speed of tracking movement $V_t$ becomes (+) and as a result the lens 43 ends up leaning in the traverse direction. In other words, when the tracking control is + (acceleration state), the speed of sled movement $V_S$ is slower than the target speed of traverse, so acceleration is required.

Figure 12C:
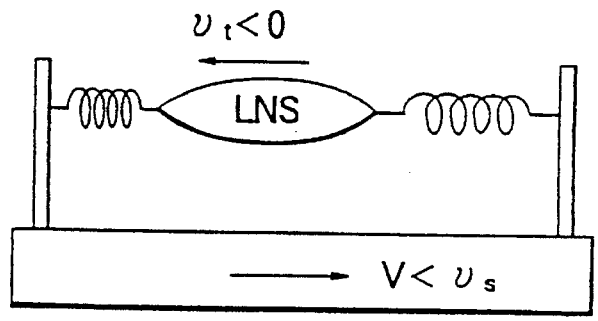

FIG. 12C shows, conversely from FIG. 12B the time when the speed of tracking movement $V_t$ is negative (<0) and the speed of sled movement $V_S$ is faster than the speed of traverse movement V. In this case, despite the fact that the tracking control attempts to hold the traverse constant, the sled SLD tries to proceed first, so as a result the speed of tracking movement $V_t$ becomes a deceleration state. That is, in such a state, the speed of sled movement $V_S$ represents faster than the target speed of traverse, so deceleration is required.

Accordingly, in this way, even with sled control, control is possible in accordance with the output signal $S_{MC}$ of the data comparison circuit MC used for the tracking control.

Further, in this embodiment, as mentioned above, if the tracking control is accelerated, the sled is also accelerated, while if the tracking control is decelerated, the sled is stopped and waits at that position for the traverse to catch up.

The tracking kick pulse command generation circuit 24 issues a command for generating a kick pulse for exactly a predetermined time $T_2$ so as to enable the target speed of traverse to be reached quickly when the traverse is started. It outputs this as the signal $S_{TKC}$ to the command selective generation circuit 22. The time $T_2$ during which the kick pulse is generated is set by the CPU.

The sled kick/brake pulse command generation circuit 26 issues a command for generating a kick pulse for exactly a predetermined time $T_1$ so as to ease the large static friction of the sled when the traverse is started. It outputs this as the signal $S_{SKC}$ to the command selective generation circuit 22.

Further, when the traverse operation is ended, a command for generating a brake pulse for exactly a predetermined time $T_3$ to stop the inertial motion of the sled is issued and output as the signal $S_{SKC}$ to the command selective generation circuit 22.

Both the time $T_1$ and $T_3$ are set by the CPU.

The traverse track number N setting/counting circuit 28 is set with the number N of traversed tracks by the CPU and counts the number of pulses of the differentiated pulse signal $S_{DIF}$ output from the rising edge differentiation circuit 10 by the A,S,N track counter. When the count reaches N, it outputs the signal $S_{NRG}$ to the command selective generation circuit CSG.

The traverse track number (N-α) setting/counting circuit 30 is set with the number (N-α) of traversed tracks by the CPU and counts the number of pulses of the differentiated pulse signal $S_{DIF}$ output from the rising edge differentiation circuit 10 by the N track counter. When the count reaches (N-α), it transmits the fact of the end of the count to the not shown CPU.

Note that the value of α is set to a value corresponding to several tracks to several tens of tracks.

The command selective generation circuit 22 issues code "$2X" commands under the control of the command selective control circuit 32 in accordance with the state of input of the output signal $S_{TPG}$ of the tracking control pulse command generation circuit 18, the output signal $S_{SPG}$ of the sled control pulse command generation circuit 20, the output signal $S_{TKC}$ of the tracking kick pulse command generation circuit 24, the output signal $S_{SKC}$ of the sled kick/brake pulse command generation circuit 26, and the output signal $S_{NRG}$ of the transverse track number N setting/counting circuit 28 and sends them to the not shown servo signal processing IC.

Next, the operation according to the above configuration will be explained based on the timing chart of FIG. 4.

Note that in FIGS. 13A to 13H, the waveform shown by TE is the tracking error signal, the waveform shown by SLD DRIVE is the waveform for the sled control, and the waveform shown by Tr DRIVE is the waveform for the tracking control.

First, when starting the traverse, target value data, for example, (1/A (where A is for example 10 kHz), is set from a not shown CPU to the target traverse cycle setting register 14, the time $T_1$ for kicking the sled is set in the sled kick/brake pulse command generation circuit 26, and the time $T_2$ for kicking the not shown tracking actuator so as to cause the target speed of-traverse to be reached at the time of start of the tracking control is set in the tracking kick pulse command generation circuit 24.

Further, the number N of tracks to be traversed is set by the CPU in the traverse track number N setting/counting circuit 28, and the number (N-α) of traversed tracks exactly the value α less than the number N of traversed tracks, that is, showing the track exactly α before the traversed track, is set by the CPU in the traverse track number (N-α) setting/counting circuit 30.

By the setting of the time $T_1$, in the sled kick/brake pulse command generation circuit 26, a command for generating the kick pulse to the sled for exactly a time $(T_1+T_2)$ is issued and output as the signal $S_{SKC}$ to the command selective generation circuit 22.

By the setting of the time $T_2$, in the tracking kick command generation circuit 24, a command for generating the kick pulse to the tracking actuator for exactly a time $T_2$ is issued and output as the signal $S_{TCK}$ to the command selective generation circuit 22.

In the command selective generation circuit 22, first, a code $26 command indicating a sled forward kick and to turn the tracking servo mechanism on is output to the not shown servo signal processing IC in accordance with the signal $S_{SKC}$ so as to ease the large static friction of the sled at the time of start of the traverse. Due to this, the sled enters an acceleration state and starts to move toward the target track.

After the elapse of the time $T_1$ from when the sled forward kick command was sent out, a forward kick to the tracking actuator is performed in addition to the sled forward kick for exactly the time $T_2$ by sending a code $2A command indicating a sled forward kick and tracking forward kick from the command selective generation circuit 22 to the servo signal processing IC. By this tracking forward kick, the target speed of traverse is reached quickly in the tracking.

After the time $T_2$ elapses from when the sled forward kick and tracking forward kick command is sent out, just the tracking forward kick is stopped by sending out a code $22 command indicating just a sled forward kick from the command selective generation circuit 22 to the servo signal processing IC.

Due to this, a tracking error signal of the frequency (feq)A shown in FIG. 13A is obtained at the optical system. This tracking error signal TE is input to the servo signal processing IC where it is digitalized and input as the signal CNIN to the rising edge differentiation circuit DIF.

In the rising edge differentiation circuit 10, the rising edge of the input signal CNIN is digitally differentiated and the differentiated pulse signal $S_{DIF}$ is generated. This generated differentiated pulse signal $S_{DIF}$ is output to the traverse cycle measuring circuit 12, transverse track number N setting/counting circuit 28, and traverse track number (N-α) setting/counting circuit 30.

In the traverse cycle measuring circuit 12, the time until the next differentiated pulse signal $S_{DIF}$ is input is measured to measure the interval (cycle) of the traverse. This measured value is output as the signal $S_{TC}$ to the data comparison circuit 16.

Further, in the traverse track number N setting/counting circuit 28, along with the input of the differentiated pulse signal $S_{DIF}$, the count of the number of pulses of the differentiated pulse signal $S_{DIF}$ output from the rising edge differentiation circuit 10 is started at the A,S,N track counter.

In the same way, in the traverse track number (N-α) setting/counting circuit 30, the count of the number of pulses of the differentiated pulse signal $S_{DIF}$ is started at the N track monitor counter.

At the data comparison circuit 16 which receives the output signal $S_{TC}$ of the traverse cycle measuring circuit 12, the actual traverse cycle indicated by the signal $S_{TC}$ and the target value set in advance in the target traverse cycle setting register RC before the traverse are compared. As a result of the comparison, a signal $S_{MC}$ indicating if the actual traverse cycle is shorter or longer than the target value is generated with each differentiated pulse signal $S_{DIF}$ and is outputs to the tracking control pulse command generation circuit 18 and sled control pulse command generation circuit 20.

In the tracking control pulse command generation circuit 18, the output signal $S_{MC}$ of the data comparison circuit 16 is received and a command for issuing the tracking control pulse $S_{TCP}$ shown in accordance with the length of the actual traverse cycle with respect to the target value is generated. The generated command is output as the signal $S_{TPG}$ to the command selective generation circuit 22. More specifically, when the actual traverse cycle is longer than the target value, a command for issuing a kick pulse for speeding up (accelerating) the traverse is generated, while when the actual traverse cycle is shorter than the target value, a command for issuing a kick pulse for slowing down (decelerating) the traverse is generated.

In the sled control pulse command generation circuit 20, the output signal $S_{MC}$ of the data comparison circuit 16 is received and a command for generating a sled control pulse $S_{SCP}$ in accordance with the length of the actual traverse cycle with respect to the target value is generated. The generated command is output as the signal $S_{SPG}$ to the command selective generation circuit 22. More specifically, when the actual traverse cycle is longer than the target value, a command for issuing a kick pulse for accelerating the sled is generated, while when the actual traverse cycle is shorter than the target value, a command for stopping the sled to wait at that position for the traverse in the deceleration state to catch up.

In the command selective generation circuit 22, a command is issued in accordance with the input of the output signal $S_{TPG}$ of the tracking control pulse command generation circuit 18 and the output signal $S_{SPG}$ of the sled control pulse command generation circuit 20 and is sent out to the servo signal processing IC. More specifically, when the tracking control is in the acceleration state, to also cause the sled to accelerate, a code $2A command indicating a tracking forward kick and a sled forward kick is sent to the servo signal processing IC. As opposed to this, when the tracking control is in the deceleration state, to cause the sled to stop at that position and wait for the traverse in the deceleration state to catch up, a code $2C command indicating a tracking reverse kick is sent to the servo signal processing IC. That is, the tracking servo system and the sled servo system of the optical system are subjected to tracking and sled control so that, relatively, the speed of tracking movement is zero and the optimal sled speed where the speed of traverse and the speed of the sled match is reached. As a result of this, the not shown optical system is moved toward the target track.

Along with the movement of the optical system, the count of the traverse track number N setting/counting circuit 28 and the count of the traverse track number (N-α) setting/counting circuit 30 are incremented and, in the end, the count of the traverse track number (N-α) setting/counting circuit 30 reaches the set value (N-α).

Along with the count reaching the set value (N-α), the fact that the count has ended is transmitted from the traverse track number (N-α) setting/counting circuit 30 to the CPU.

By the end of the count of the traverse track number (N-α) setting/counting circuit 30, a value larger than the target value (1/A) at the time of the start of the traverse (that is, the value 1/B, where A>B and B is for example 4 kHz) is set in the target traverse cycle setting register RC from the CPU so as to set a speed able to be stably stopped at any time.

Further, the traverse track number N setting/counting circuit NRG is set with the time $T_3$ for braking the sled when the count reaches the target tracks N.

After this, it is necessary to stop the traverse stably, so to stop the linkage control of the sled with the tracking control and stop the drive, a code $28 command indicating a tracking forward kick or a code $2C command indicating the tracking reverse is output from the command selective generation circuit 22 to the servo signal processing IC.

By this, the optical system is moved toward the target track by a speed slower than the speed up until the number of traversed tracks reached (N-α).

Along with the decelerated movement of the optical system, the count of the traverse track number N setting/counting circuit 28 is incremented and finally the count reaches the set value N.

Along with the count reaching the set value N, a signal $S_{NRG}$ is output from the traverse track number N setting/counting circuit 28 to the command selective generation circuit 22.

In the command selective generation circuit 22, along with the input of the signal $S_{NRG}$, a command for issuing a reverse (brake) pulse for exactly the time $T_3$ is generated to end the traverse. That is, a code $27 command indicating a tracking reverse kick and a sled reverse kick is sent to the servo signal processing IC. By this, the inertial motion of the sled is stopped and the lens of the optical system is stopped at a position directly facing the target track.

After the elapse of the time $T_3$ from when the tracking and sled reverse kick command is sent out, a code $25 command indicating to turn the tracking servo mechanism on and turn the sled servo mechanism on is sent from the command selective generation circuit CSG to the servo signal processing IC.

As explained above, according to the present embodiment, the actual traverse cycle is measured, tracking and sled control is performed so that the traverse cycle converges to an arbitrarily settable target value, and the target value of the traverse cycle is made larger and the traverse speed is reduced at the point of time when exactly the number of tracks shorter by α from the target number of traversed tracks N are traversed, so it is possible to traverse at a fixed speed in accordance with a target value (set value) and possible to stop the traverse operation with a good precision without over-run no matter what the timing the traverse is ended at.

Further, it is possible to control at a high speed the traverse speed before the number of tracks smaller by exactly α than the target number of traversed tracks N is reached and to control the speed to a speed enabling stable stopping of the traverse after that, so it is possible to greatly reduce the total time required for the traverse.

Further it is possible to control the sled in accordance with the state of the traverse and, further, provision is made of a circuit enabling control of the lens to the center position at all times during the traverse, so when the number of traversed tracks becomes more than several hundred tracks, there is no problem of the controllable range of tracking ending up being exceeded as in the past in the state with the sled stopped and traverses of over several hundred tracks can be handled as well.

In addition, a kick pulse is generated for exactly a predetermined time to ease the static friction of the sled at the time of starting the traverse, so the time of start of the traverse operation is stabilized.

Further, a tracking kick pulse is generated for exactly a predetermined time at the time of the start of the traverse operation, so there is the advantage that the time until the target traverse speed is reached is shortened.

As explained above, according to the present invention, it is possible to traverse at a fixed speed in accordance with the target value (set value) and possible to cause the traverse to stop with a good precision without over-run no matter what the timing the traverse is ended at.

Further, it is possible to control the traverse speed at a high speed before reaching a number of tracks exactly α less than the target number of traversed tracks N and it is possible to control the speed to one at which the traverse ends stably after that, so it is possible to greatly reduce the total time required for the traverse.

Further, it is possible to control the sled in accordance with the state of the traverse, possible to control the head to the center position at all times during the traverse, and deal with traverses of over several hundred tracks as well.

Still further, kick pulses are generated for exactly a predetermined time so as to ease the static friction of the sled at the time when starting the traverse, so the time of the start of the traverse operation is stabilized.

Further, at the time of start of the traverse operation, tracking kick pulses are generated for exactly a predetermined time, so the time until reaching the target traverse speed can be shortened.

Note that the present invention is not limited to the above embodiment and can be modified in various ways within the scope of the invention.

What is claimed is:

1. A tracking traverse control circuit for making a head unit, disposed so as to face a recording medium on which a plurality of tracks are formed, move from a current track to a target track, comprising:

a movement speed detection means for detecting the speed of movement of said head unit based on a signal obtained from said head unit at a time of track traverse; and a movement speed control means for comparing the detected speed of movement and a preset target value of a speed of movement and controlling the speed of movement of said head unit so that the detected speed of movement converges with said preset target value; wherein:

said head unit has a tracking servo system and a sled servo system for making the entire head unit move; and said movement speed control means sets said sled servo system to an acceleration state when said tracking servo system is set to the acceleration state and sets said sled servo system to a stopped state when the tracking servo system is set to a deceleration state in accordance with a comparison of said detected speed of movement and said preset target value.

2. A tracking traverse control circuit for making a head unit, disposed so as to face a recording medium on which a plurality of tracks are formed, move from a current track to a target track, comprising:

a movement speed detection means for detecting the speed of movement of said head unit based on a signal obtained from said head unit at a time of track traverse; and a movement speed control means for comparing the detected speed of movement and a preset target value of a speed of movement and controlling the speed of movement of said head unit so that the detected speed of movement converges with said preset target value; wherein:

said head unit has a tracking servo system and a sled servo system for making the entire head unit move; and said movement speed control means sets said sled servo system to an acceleration state when the tracking servo system is set to the acceleration state and sets said sled servo system to a deceleration state when the tracking servo system is set to a deceleration state in accordance with the results of a comparison of said detected speed movement and said preset target value.

3. A tracking traverse control circuit as set forth in claim 2, comprising a means for causing said sled servo system to accelerate for a predetermined time when starting the traverse.

4. A tracking traverse control circuit as set forth in claim 2, comprising a means for causing said tracking servo system to accelerate for a predetermined time when starting the traverse.

5. A tracking traverse control circuit as set forth in claim 2, comprising a means for applying braking to said sled servo system when the count of the counting means reaches the target number of traversed tracks.

6. A tracking traverse control circuit for making a head unit, disposed so as to face a recording medium on which a plurality of tracks are formed, move from a current track to a target track, comprising:

a movement speed detection means for detecting the speed of movement of said head unit based on a signal obtained from said head unit at the time of a track traverse;

a target value setting means for setting a target value of the speed of movement of said head unit to any value;

a movement speed control means for comparing the detected speed of movement and a set target value of a speed of movement and controlling the speed of movement of said head unit so that the detected speed of movement converges with said set target value;

a counting means for counting the number of traversed tracks based on a signal obtained from said head unit; and a target value changing means for resetting said set target value of the target value setting means to a value of a speed of movement controlled for deceleration when the count of the counting means reaches a number of tracks less than the target number of traversed tracks by exactly a preset number of tracks.

7. A tracking traverse control circuit as set forth in claim 6, wherein said head unit has a tracking servo system and a sled servo system for making the entire head unit move and said movement speed control means sets said sled servo system to an acceleration state when the tracking servo system is set to the acceleration state and sets said sled servo system to a deceleration state when the tracking servo system is set to a deceleration state in accordance with the results of comparison of said detected speed of movement and said set target value.

8. A tracking traverse control circuit as set forth in claim 7, comprising a means for causing said sled servo system to accelerate for a predetermined time when starting the traverse.

9. A tracking traverse control circuit as set forth in claim 7, comprising a means for causing said tracking servo system to accelerate for a predetermined time when starting the traverse.

10. A tracking traverse control circuit as set forth in claim 7, comprising a means for applying braking to said sled servo system when the count of the counting means reaches the target number of traversed tracks.

11. A tracking traverse control circuit as set forth in claim 6, wherein said head unit has a tracking servo system and a sled servo system for making the entire head unit move and said movement speed control means sets said sled servo system to an acceleration state when said tracking servo system is set to the acceleration state and sets said sled servo system to a stopped state when the tracking servo system is set to a deceleration state in accordance with the results of comparison of said detected speed of movement and said set target value.

12. A tracking traverse control circuit as set forth in claim 6 wherein:

said head unit has a tracking servo system and a sled servo system for making the entire head unit move and said movement speed control means sets said sled servo system to an acceleration state when said tracking servo system is set to the acceleration state and sets said sled servo system to a deceleration state when said tracking servo system is set to a deceleration state in accordance with the results of comparison of said detected speed of movement and said set target value before the count of the counting means reaches said number of tracks less than the target number of traversed tracks by exactly said preset number of tracks and sets at least said sled servo system to the deceleration state after the count of the counting means reaches said number of tracks less than said target number of traversed tracks by exactly said preset number of tracks.

* * * * *